March 10, 1964 H. S. MIILLER 3,124,677

COMPARATOR UTILIZING THRESHOLD ORGANS

Filed July 18, 1960 3 Sheets-Sheet 1

INVENTOR.
HENRY S. MIILLER
BY John V. Regan
ATTORNEY

March 10, 1964 H. S. MILLER 3,124,677

COMPARATOR UTILIZING THRESHOLD ORGANS

Filed July 18, 1960

3 Sheets-Sheet 2

INVENTOR.
HENRY S. MILLER
BY John V. Regan
ATTORNEY

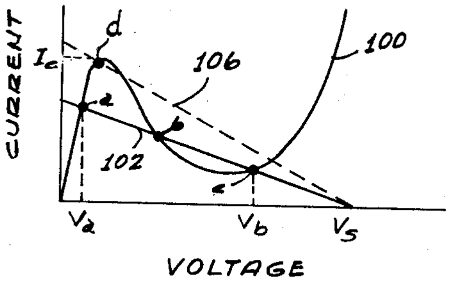
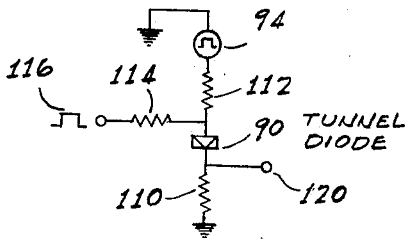
Fig. 6 Fig. 7
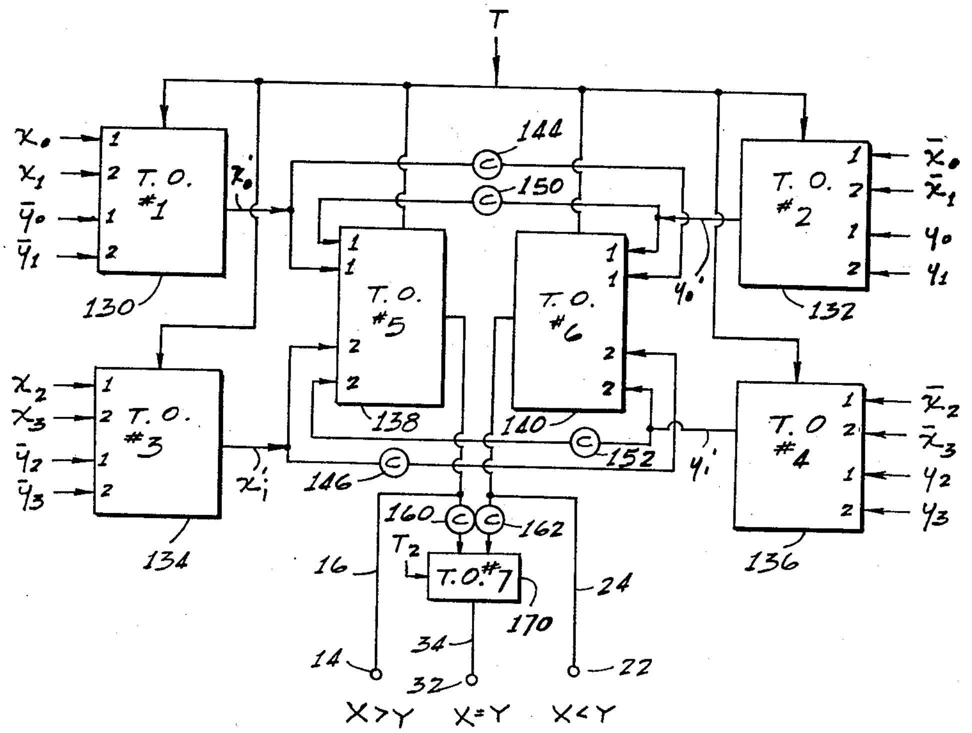
Fig. 8
INVENTOR.
HENRY S. MIILLER
BY John V. Regan
ATTORNEY

United States Patent Office 3,124,677
Patented Mar. 10, 1964

3,124,677

COMPARATOR UTILIZING THRESHOLD ORGANS

Henry S. Miiller, Trenton, N.J., assignor to Radio Corporation of America, a corporation of Delaware Filed July 18, 1960, Ser. No. 43,660
15 Claims. (Cl. 235—177)

This invention relates to information handling devices and, more particularly, to a method and apparatus for comparing two binary quantities.

Fundamental to data processing systems are apparatus which effect comparison between binary quantities or characters. In some applications, certain sorting and conditional transfer applications for example, it is required that the comparator provide not only an indication of equality, but also an indication as to which of the quantities is the larger, or smaller, when the compared quantities are unequal.

Most digital computers employ the binary system of notation for representing information. In general, a predetermined number of binary digits are selected as a character length, and each desired letter, symbol, number, etc. may be represented by a different combination of binary "ones" and "zeroes" in a character.

It is desirable in the interests of high speed that the binary digits of a character be handled in parallel by the comparator. It is also desirable that the comparator include a minimum number of logic networks and stages, and that the networks and stages employed have a high operating speed in order to reduce the decision-making time to a minimum.

Accordingly, it is an object of this invention to provide improved apparatus for comparing binary quantities.

It is another object of this invention to provide a comparator device for comparing rapidly binary information encoded as parallel digits.

It is still another object of this invention to provide an improved digital comparator which provides an indication when the compared quantities are equal, and which provides an indication as to which quantity is the larger, or smaller, when the compared quantities are unequal.

It is yet another object of this invention to provide an improved digital comparator which has a reduced number of components and a high operating speed.

In accordnce with one embodiment of the invention, these and other objects are accomplished by first and second threshold organs, means for applying to said first and second organs signals weighted according to digit significance and representing, respectively, the binary digits of first and second binary quantities to be compared, means for applying to said first and second organs signals weighted according to digit significance and representing, respectively, the bit-by-bit binary complements of the digits of said second and first quantities, and means for sampling the outputs of said organs.

In the accompanying drawing, like reference characters refer to like components, and:

FIGURE 6 is a volt-ampere characteristic of the tunnel diode of FIGURE 5;

FIGURE 7 is a schematic diagram of a baseband complementary device; and

FIGURE 8 is a block diagram of another comparator arrangement according to the invention.

Figure 1:
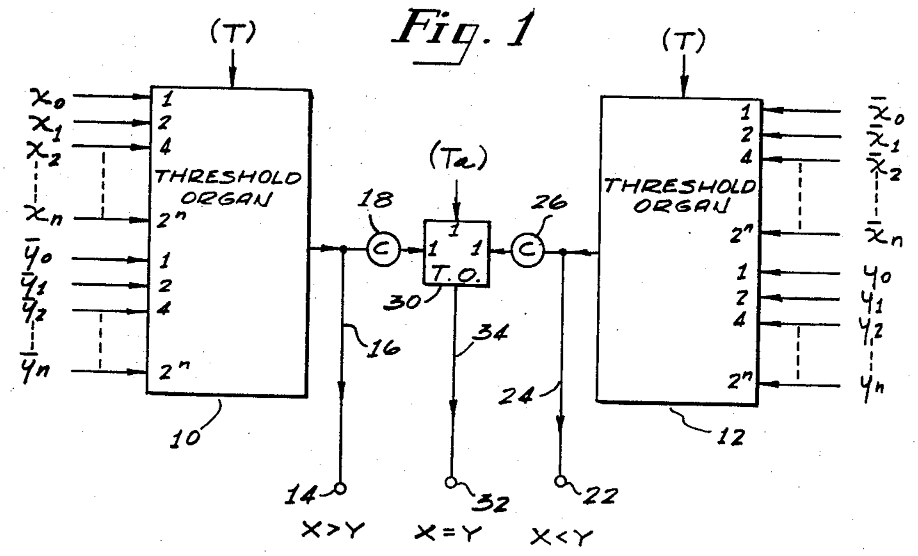
FIGURE 1 is a generalized block diagram of a comparator according to the invention.

Before proceeding with a description of the apparatus, a preliminary discussion of the binary information signals occurring during the comparison process and their relation is given to facilitate the reader's understanding of the invention. It is believed that the description of the interconnection of the various units of the comparator and its operation can then be explained in a more simple and understandable manner in the light of the review.

Binary notation has many variations evolving from a pure binary system. In pure binary notation, it is customary to write a number (as in decimal notation) with the most significant digit at the leftmost position, and with the digits of lesser significance arranged in succeeding digit positions, and in order, left to right. At each digit position, only one of two values is employed, binary "1" or binary "0." A binary number A may be expressed generally as follows:

$$A = a_n a_{n-1} \ldots a_2 a_1 a_0 \qquad (1)$$

where $a_n$ is the digit or bit of the $n+1$th digit position, and where $a_n$, $a_{n-1}$, etc each may be either binary "1" or "0."

The digit positions represent the successive powers to the base two, starting with the least, or zero, power at the right, in contrast with the successive powers to the base ten employed in the decimal system of notation. The presence of a binary "1" in a digit position means that the corresponding power of two is added in the number; the presence of a binary "0" means that the power of two corresponding to that position is not added The decimal equivalent $A_D$ of the binary number A may be determined readily by adding the powers of two as follows:

$$A_D = 2^n a_n + 2^{n-1} a_{n-1} \ldots 2^2 a_2 + 2^1 a_1 + 2^0 a_0 \qquad (2)$$

Consider the binary number 1011 by way of example. The decimal equivalent of this number is $2^3(1) + 2^1(1) + 2^0(1) = 11$. It is noted that each of the binary digits, or bits, has a "weight" or value in the decimal system corresponding to its significance in the number, as expressed by the numerical coefficient in Formula 2. Referring to the above example, the weights of the binary "1's" in the binary number 1011 are 8, 2 and 1, respectively, reading from left to right.

Other binary coding schemes are known in the art and need not be discussed here. In general, in these binary systems, alphabetic characters are coded such that the binary values of the characters increase from A to Z, that is, the binary value of the letter B is greater than that of A and less than that of C. Therefore, two binary quantities representing letters of the alphabet may be compared by comparing the "decimal equivalents" of their binary representations. The present invention is not limited to use with any particular system of binary notation. However, the invention will be described, for convenience, in connection with the pure binary notation scheme of number representation.

A further quantity, defined as the bit by bit one's complement, or binary complement, of the binary quantity A is as follows:

$$\overline{A} = \overline{a_n}\ \overline{a_{n-1}} \ldots \overline{a_2}\ \overline{a_1}\ \overline{a_0} \qquad (3)$$

where $\overline{a_n}$ has the meaning "not $a_n$." The decimal equivalent $\overline{A}_D$ of $\overline{A}$ is then:

$$\overline{A}_D = 2^n \overline{a}_n + 2^{n-1} \overline{a}_{n-1} \ldots 2^2 \overline{a}_2 + 2^1 \overline{a}_1 + 2^0 \overline{a}_0 \qquad (4)$$

If, for example, $A = 1011$, then $\overline{A} = 0100$ and $\overline{A}_D = 2^2(1)$ or 4.

Let X and Y be two binary numbers or quantities to be compared, where $$X = x_n x_{n-1} \ldots x_2 x_1 x_0 \quad (5)$$

and $$Y = y_n y_{n-1} \ldots y_2 y_1 y_0 \quad (6)$$

The decimal equivalents $X_D$, $Y_D$ of these binary quantities X and Y, and the decimal equivalents $\overline{X}_D$ and $\overline{Y}_D$ of the bit one's complements $\overline{X}$ and $\overline{Y}$ are as follows:

$$X_D = 2^n x_n + 2^{n-1} x_{n-1} \ldots 2^2 x_2 + 2^1 x_1 + 2^0 x_0 \quad (7)$$

$$Y_D = 2^n y_n + 2^{n-1} y_{n-1} \ldots 2^2 y_2 + 2^1 y_1 + 2^0 y_0 \quad (8)$$

$$\overline{X}_D = 2^n \overline{x_n} + 2^{n-1} \overline{x_{n-1}} \ldots 2^2 \overline{x_2} + 2^1 \overline{x_1} + 2^0 \overline{x_0} \quad (9)$$

$$\overline{Y}_D = 2^n \overline{y_n} + 2^{n-1} \overline{y_{n-1}} \ldots 2^2 \overline{y_2} + 2^1 \overline{y_1} + 2^0 \overline{y_0} \quad (10)$$

Assume that the binary quantity X is greater than Y. Then, $$(2^n x_n + 2^{n-1} x_{n-1} \ldots 2^0 x_0) > (2^n y_n + 2^{n-1} y_{n-1} \ldots + 2^0 y_0) \quad (11)$$

where the $x$'s and $y$'s are restricted to the values of "1" and "0." The quantity $\overline{Y}_D$ may be added to both sides of inequality (11) without altering the inequality to obtain the following results:

$$X_D + \overline{Y}_D > \sum_{k=0}^{n} 2^k (y_k + \overline{y}_k) \quad (12)$$

Inequality (12) may be mechanized by a threshold organ in a manner to be described hereinafter. A threshold organ may be defined for present purposes as a multi-input device having a threshold, and providing a first output when the summation of the inputs thereto equals or exceeds the threshold, and a second, different output when the summation of the inputs is less than the threshold. In some applications, depending upon the type of signals used to represent the binary digits, a special case exists where the threshold of the organ may be zero. In any case, the signals representing the various binary digits applied to the organ are effectively weighted in accordance with the particular significance of the digits. The term "threshold organ" is used here in a generic sense and, as will be apparent from the following discussion, may include certain types of devices sometimes referred to as "majority" organs or gates.

In terms of number representation, several conclusions may be drawn with respect to the summation term in inequality (12). If the electrical signals employed to represent the binary digits are endowed with veto or cancellation power, then the value of the summation term equals a null. Such a condition exists, for example, where phase script notation is employed, that is, where a binary "1" is a radio frequency (*rf*) signal of one phase and a "0" is an *rf* signal of the counter phase at the same frequency and having the same amplitude. Signals representing "1" and "0" in phase script cancel or veto each other if they have equal magnitudes. The same condition obtains where a "1" is a pulse of one polarity and amplitude and a "0" is a pulse of the opposite polarity and the same amplitude. The right-hand or summation term of inequality (12) has a value equal to $$\sum_{k=0}^{n} 2^k$$

when the number representation is not endowed with veto or cancellation power, as when pulse, no pulse binary digit signal representation is employed. In either event, the threshold of the organ is determined by the summation term, and preferably is set slightly higher than the value of the summation term for reasons which will be apparent from the following discussion.

The technique employed in deriving inequality (12) may be extended to derive equations expressing the conditions where $X=Y$ and $Y>X$.

If $X=Y$, then $$X_D + \overline{Y}_D = \sum_{k=0}^{n} 2^k (y_k + \overline{y}_k) \quad (13)$$

and $$X_D + \overline{X}_D = \sum_{k=0}^{n} 2^k (x_k + \overline{x}_k) \quad (14)$$

If $Y>X$, then $$X_D + \overline{Y}_D < \sum_{k=0}^{n} 2^k (y_k + \overline{y}_k) \quad (15)$$

and $$Y_D + \overline{X}_D > \sum_{k=0}^{n} 2^k (x_k + \overline{x}_k) \quad (16)$$

Inequality (16) may be mechanized by a second threshold organ similar to the first organ. The organ provides a first output when the summation of the inputs equals or exceeds the threshold, and a second, different output when the summation is less than the threshold.

It is to be noted that the summation term in Equation 13 is the same as that of inequality (12). Therefore, with the definition of "threshold" given heretofore, if it is desired that the first organ provide said first output only when $X>Y$, then the threshold should be set slightly higher than the value of the summation term of inequality (12) or Equation 13. Likewise, the threshold of the second organ should be set slightly higher than the value of the summation term of Equation 14 or inequality (16) if the second organ is to provide said first output only when $Y>X$. Equality of X and Y then may be recognized by the simultaneous occurrence of said second output from both organs. If, on the other hand, the thresholds are set such that the first organ provides said first output when $X>Y$ or $X=Y$, and the second organ provides said first output when $Y=X$ or $Y>X$, equality of X and Y may be recognized by the simultaneous occurrence of said first output from both organs. The first method of setting the threshold is preferred in most applications.

FIGURE 1 is a block diagram of a preferred embodiment of a comparator according to the invention. Common circuit connections such as circuit ground are omitted for clarity of drawing. Blocks 10 and 12 include multi-input threshold organs which have the characteristics described previously. Signals representing the binary $x_0 \ldots x_n$ of the binary quantity X are applied to a first plurality of inputs of the threshold organ 10. In most systems a signal corresponding to a binary "1" has the same amplitude regardless of its digit position in the binary quantity. Inequality (12) signifies that the threshold organ must receive signals which are weighted according to digit significance. The input signals may be weighted at the input of the threshold organ 10 in a manner to be described more fully thereinafter. The numbers, within the block 10, adjacent to the arrows on the input leads denote the weights of the input signals applied to the threshold organ 10. These weights correspond to the coefficients of the binary digits as given by Equation 7.

A second plurality of input signals corresponding to the bit by bit binary complements of the digits $y_0 \ldots y_n$ of the quantity Y are applied to a second plurality of input terminals of the threshold organ 10. These inputs are designated $\overline{y}_0 \ldots \overline{y}_n$. These inputs also are weighted at the threshold organ 10 in accordance with their digit significance. Applied to another terminal of the threshold organ 10 is a threshold (T) voltage or signal. The threshold voltage or signal is selected in accordance with inequality (12) and the discussion which follows immediately thereafter. If X is greater than Y, then the summation of the information input signals to the threshold organ 10 is greater than the value of the term $$\sum_{k=0}^{n} 2^k (y_k + \bar{y}_k)$$

This term, as described heretofore, has a value of either $$\sum_{k=0}^{n} 2^k$$

or zero. The threshold (T) voltage or signal is selected in the general case to have a magnitude which is slightly greater than $$\sum_{k=0}^{n} 2^k$$

or zero, depending upon the particular signal representation of the binary digits.

Signals corresponding to the binary digits $y_0 \ldots y_n$ are applied to a plurality of input terminals of the second threshold organ 12. Signals $\bar{x}_0 \ldots \bar{x}_n$ corresponding to the binary complements of the individual digits $x_0 \ldots x_n$ are applied to another plurality of input terminals of the second organ 12. Also applied to this organ 12 is a threshold (T) signal or voltage having the same value as the threshold (T) of the first organ 10.

The first threshold organ 10 provides a first output, which may represent binary "1", when the binary quantity X is greater than the quantity Y, and a second, different output, which may correspond to binary "0" when X is equal to or less than Y. The second threshold organ 12 provides the first output when Y is greater than X and the second output when Y is equal to, or less than X.

The output of the first threshold organ 10 is applied to a first output terminal 14 over a line 16, and also is applied to a binary complementing device 18, designated "C". The complementing device 18 provides an output signal representing a binary "1" in response to a received signal representing a binary "0," and vice versa. The output of the second threshold organ 12 is applied to a second output terminal 22 over a line 24 and also is applied to the input of a complementing device 26. The complementing device 26 may be identical to the complementing device 18.

The outputs of the complementing devices 18 and 26 are applied to first and second input terminals of a third threshold organ 30. A threshold (T*a*) signal or voltage is applied to a third input of the threshold organ 30. The value of the threshold signal (T*a*) is selected such that a first output corresponding to a binary "1" is provided by the organ 30 only when the outputs of both of the complementing devices 18, 26 correspond to binary "1". The third organ 30 may be a simple "and" gate in many cases. The output of the third threshold organ 30 is applied to an output terminal 32 over a line 34.

The output system of the threshold organs described is arranged so that a signal corresponding to a binary "1" is present at only one output terminal 14, 22, 32 at any one time. Such a signal appearing at an output terminal has the significance indicated by the notation beneath that output terminal in FIGURE 1. For example, a signal corresponding to binary "1" at output terminal 14 signifies that X is greater than Y.

It will be apparent that the complementing devices 18, 26 may be eliminated if the thresholds of organs 10, 12 are adjusted so that both of these organs provide an output representing binary "1" when X and Y are equal.

One device suitable for use as a threshold organ 10, 12 in practicing the invention is a parametric phase-locked oscillator (PLO) of the type described in an article by Fred Sterzer in the Proceedings of the IRE, August 1959, at page 1318. Such oscillators, as is known, are capable of oscillating in the kilomegacycle range with high switching speed. A PLO may be used as the threshold organ in a system wherein a binary "1" is represented by an RF signal of one phase, and a binary "0" is represented by an RF signal of a counter phase at the same frequency and amplitude. The input signals to such a device have veto or cancellation power. That is to say, a binary "1" signal cancels a binary "0" signal of the same weight.

Operation of a PLO is described in detail in the aforementioned article and will not be described here. Suffice it to say that a PLO may oscillate parametrically in one phase or a counter phase at a frequency *f* when energized by signals from a pump at a frequency 2*f*. Which phase the oscillations assume is determined by conditions existing in the tank circuit when the pump signals are applied. Oscillations may be steered into a selected phase by applying a small locking signal, at or near the desired phase, to the PLO prior to energization thereof. If no locking signal is applied, however, the phase of oscillations is indeterminate. In the embodiment of FIGURE 1, the summation of the input signals to the threshold organ is the locking signal which determines the phase of oscillations of the PLO. To prevent indeterminacy when $X=Y$, a small signal having a phase representing binary "0" is applied as the threshold T.

Figure 2:
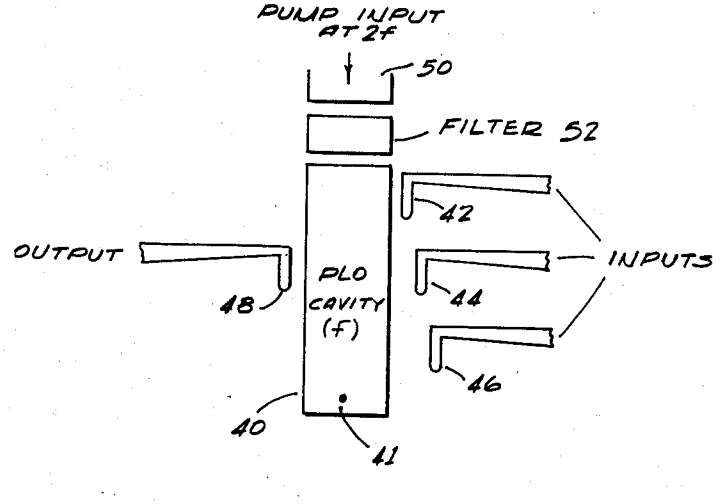
FIGURE 2 is a diagram of a parametric phase locked oscillator and means for weighting the input signals thereto.

FIGURE 2 illustrates one method of weighting the information input signals when a PLO of the type illustrated and described in the article aforementioned is used as the threshold organ. The PLO cavity 40 may be a section of strip transmission line having a variable capacitance diode 41 mounted at one end, as described in the article aforementioned. The cavity is resonant at a frequency *f*. Input antennas are positioned adjacent the PLO cavity 40. Only three antennas 42, 44, 46 are illustrated in the drawing. Weighting of the input signals is accomplished by weighting the coupling constants of the antennas 42, 44, 46 to the cavity 40, as shown in FIGURE 2. Any phase shift of the input signals which results from weighting the coupling may be compensated by suitable selection of input line length. An output antenna 48 is positioned adjacent the cavity 40 to provide an output signal for transmission to the output terminal 14, or 22. All of the antennas may be constructed of strip transmission line.

Parametric oscillations are sustained at a frequency *f* in the cavity 40 when pump signals of a frequency 2*f* are coupled to the cavity 40. The pump signals are transmitted to the cavity 40 over a section of strip transmission line 50 from a source (not shown). A length of line 52 which is approximately an odd number of half wavelengths long at the pump frequency serves as a filter to prevent the oscillations of frequency *f* from being fed back to the pump. The parametric oscillations may be damped periodically by interrupting the pump. Oscillations then resume in a phase determined by the locking signal when the pump signals are next applied. Other techniques for weighting the input signals to a strip transmission line PLO include the use of directional couplers with properly weighted coupling constants and the use of a weighted power divider.

The complementing devices 18, 26 of FIGURE 1 may be, for example, suitable lengths of transmission line when phase script signals are employed to represent the binary digits. A transmission line an add number of half wavelengths long at the operating frequency serves to invert an alternating current signal. The third organ 30 may be another PLO of the type described to which is applied a threshold (T*a*) signal in the form of a small radio frequency signal of frequency *f* and having a phase corresponding to binary "0."

Figure 3:
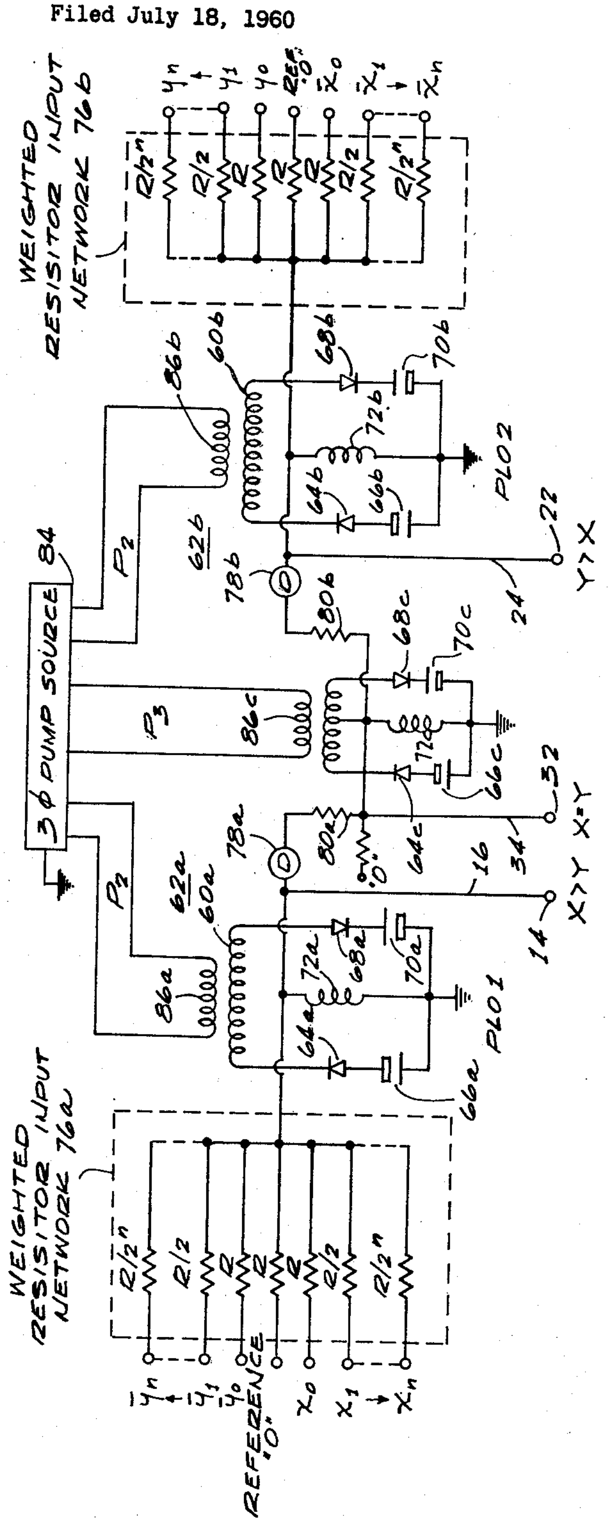
FIGURE 3 is a schematic diagram of the FIGURE 1 comparator implemented with phase locked oscillators.

FIGURE 3 is a drawing of a comparator wherein the threshold organs are balanced PLO's of the so-called lumped constant type, as distinguished from distributed constants. It will be apparent from the following description, however, that PLO's of the distributed constant type (FIGURE 2) also may be used. PLO1, the PLO on the left, as viewed in the drawing, comprises the secondary winding 60a of a transformer 62a. The left end of the winding 60a is connected to the cathode of a voltage sensitive, variable capacitance diode 64a. The negative terminal of a biasing source, illustrated as a battery 66a, is connected to the anode of the diode 64a. The right end of the secondary winding 60a is connected to the anode of a second variable capacitance diode 68a, the cathode thereof being connected to the positive terminal of a battery 70a. The negative terminal of the battery 70a and the positive terminal of the first battery 66a are connected to a point of reference potential, illustrated as circuit ground. The secondary winding 60a is center-tapped, and an inductor 72a is connected between the center tap and circuit ground. It will be apparent to one skilled in the art that only one resonant circuit is necessary for PLO operation. The particular configuration described above, however, has the advantage that components of the pump frequency developed across winding 60a are cancelled out in the inductor 72a by action of two balanced, resonant circuits.

PLO2, on the right of the drawing, and PLO3, in the center of the drawing, are similar to PLO1 and will not be described further. Like components of PLO's 1, 2 and 3 are designated by like numerical reference characters followed by alphabetic characters *a, b, c,* respectively.

Phase script signals representing the binary digits $x_0 \ldots x_n$ of a first binary quantity X are applied to a first plurality of input terminals of a weighted resistor input network 76a. Phase script signals representing the binary complements $\bar{y}_0 \ldots \bar{y}_n$ of the digits of a second binary quantity Y are applied to a second plurality of input terminals of the network 76a. The phase script signals are alternating current signals of one phase or a counter phase at the oscillating frequency $f$ of the PLO's.

Each of the input terminals is connected by a separate resistor to the top of the inductor 72a of the PLO1. The values of the resistors in the network 76a are chosen so that the signals applied to the PLO1 are weighted in accordance with their corresponding digit significance, as expressed, for example, by the coefficients in Equations 7 through 10. The phase script signal corresponding to $x_0$, for example, is coupled to PLO1 by a resistor having a value R; the signal corresponding to $x_1$ is coupled to PLO1 by a resistor having a value $R/2$, and the signal corresponding to $x_n$ is coupled by a resistor having a value $R/2^n$. Resistors for the other inputs $x_2 \ldots x_{n-1}$ are omitted for clarity. Consequently, the signals corresponding to $x_0, x_1 \ldots x_n$ reach PLO1 with relative weights of $1, 2 \ldots 2^n$, respectively. In like manner, signals corresponding to $\bar{y}_0, \bar{y}_1 \ldots \bar{y}_n$ reach PLO1 with relative weights of $1, 2 \ldots 2^n$, respectively.

Phase script signals representing the binary digits $y_0 \ldots y_n$ of Y and binary complements $\bar{x}_0 \ldots \bar{x}_n$ of the digits of X are applied to individual input terminals of a second weighted resistor input network 76b. This network 76b is similar to the first network 76a. The output of the weighted resistor network 76b is connected to the top of the inductor 72b in the PLO2.

The output of PLO1 is applied to a first output terminal 14 over a line 16 which connects to the top of the inductor 72a. The output of PLO1 is also coupled to the third PLO through a delay means 78a and a resistor 80a. The delay means 78a inverts or complements the output of PLO1 to provide a signal corresponding to binary "0" when the input thereto is a binary "1," and vice-versa. The output of PLO2 is applied to an output terminal 22 over a line 24, and is also applied to PLO3 through a delay means 78b and a resistor 80b. The output of PLO3 is applied to an output terminal 32 over a line 34.

A PLO is essentially a two-terminal device having a common input-output terminal. Consequently, means must be provided to assure flow of information in one direction only. One method of obtaining transfer of information in a specified direction is to energize the PLO's of a system in timed sequence from a three phase pump, or from three separate pumps which provide an overlapping sequence of pump signals. A detailed description of three phase pumping applied to PLO's is given in an article by L. Onyshkevych et al. in the IRE Transactions on Electronic Computers, September 1959, at page 282.

In FIGURE 3, the three phase pump source is illustrated by a single block 84. The pump 84 provides the overlapping sequence of energizing signals illustrated in FIGURE 4. Energizing signals of phase 1 ($P_1$) may be applied to the sources of the $x$ and $y$ input signals to the comparator. Energizing signals of phase 2 ($P_2$) may be applied to PLO's 1 and 2 by way of transformer primary windings 86a and 86b, respectively, and energizing signals of phase 3 ($P_3$) may be applied to PLO3 by way of transformer primary winding 86c.

Consider now the operation of the arrangement of FIGURE 3. Pump signals of phase 1 and of a frequency $2f$ may be applied to the information PLO sources (not shown) at a time $t_1$. PLO's 1 and 2 are not energized by the pump 84 at this time and, hence, do not oscillate. Digital information signals of frequency $f$ are applied to the inputs of the weighted resister networks 76a, 76b from the information PLO sources. These signals are weighted according to digit significance by the resistors in the weighted resistor networks 76a, 76b, and the networks provide output signals of frequency $f$ and of an amplitude representing the summation of the weighted signals.

If the binary quantity X is greater than Y, a binary "1" signal is supplied as a locking signal to PLO1 by the resistor network 76a and a binary "0" signal is supplied as a locking signal to PLO2 by the other resistor network 76b. The locking signals supplied by these networks 76a, 76b are reversed if Y is greater than X. Phase script signals have cancellation or veto power, as discussed hereinabove. Therefore, the information signals applied to the networks 76a, 76b cancel each other out if X is equal to Y. Ordinarily, therefore, no phase locking signal would be supplied to PLO's 1 and 2 when $X=Y$, and the phase of oscillations of these PLO's would be indeterminate. To prevent such indeterminancy, a small reference signal of frequency $f$ and of a phase representing a binary "0" is supplied to each of the weighted resistor networks 76a, 76b. This reference signal may be viewed as a threshold signal. Accordingly, weighted resistor network 76a supplies a binary "1" locking signa to PLO1 only when X is greater than Y, and supplies a binary "0" locking signal when X is equal to or less than Y. Weighted resistor network 76b supplies a binary "1" locking signal to PLO2 only when Y is greater than X.

The pump 84 supplies energizing signals at a frequency $2f$ to the PLO's 1 and 2 at a time $t_3$. The outputs of the weighted resistor networks 76a, 76b are supplied as locking signals to PLO's 1 and 2, respectively, at this time, and oscillations build up in PLO's 1 and 2 at a frequency $f$ in phase with the respective locking signals. The output of PLO1 appears at the output terminal 14 and the output of PLO2 appears at the output terminal 22. A portion of the output of each of these PLO's is inverted and supplied to the third PLO. Also applied to PLO3 is a reference signal having a phase representing binary "0." The sum of these three signals determines the phase of oscillation of PLO3 when this PLO is energized by the pump 84 at a time $t_5$. PLO3 provides a binary "1" output only when both information inputs thereto are binary "1," a condition existing only when $X=Y$.

Figure 5:
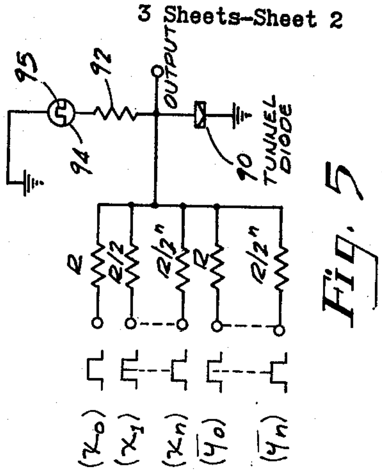
FIGURE 5 is a schematic diagram of a tunnel diode threshold organ.

FIGURE 5 is a schematic diagram of a threshold organ 10 suitable for use in a baseband system wherein a binary "1" is represented by a pulse of one polarity, and a binary "0" is represented either by the absence of a pulse or by a pulse of the opposite polarity. In the latter case, a binary "0" and a binary "1" signal of the same weight cancel one another. No cancellation obtains in the former case. The circuit comprises the series combination of a tunnel diode 90, a resistor 92 and a voltage pulse source 94. The cathode of the tunnel diode 90 is connected to a point of reference potential, indicated as circuit ground. One terminal of the pulse source 94 is connected to ground; positive energizing pulses appear periodically at the other terminal and across the resistor 92, diode 90 combination. Tunnel diodes and their characteristics are described in detail in the article by H. S. Sommers, Jr. in the Proceedings of the IRE, July 1959, at page 1201, and in other publications, and will not be described here except as is necessary to describe the operation of the circuit.

FIGURE 6 illustrates the operating characteristics of the FIGURE 5 circuit. A curve 100 illustrates the volt-ampere characteristic of the tunnel diode 90. A load line 102, whose slope is determined by the value of resistor 92, intersects the characteristic curve 100 at points *a*, *b* and *c*. The points *a* and *c* intersect the curve 100 in regions of positive resistance and are points of stable operation. The point *b* is a point of intersection in the region of negative resistance and, for the indicated loading, the circuit cannot be maintained quiescently at this intersection point. The FIGURE 5 circuit, therefore, is bistable; that is, it has two stable operating states. When the circuit is in the state represented by operating point *a*, the voltage across the diode 90 is relatively low, corresponding to binary "0." Conduction through the diode 90 is high at this time. When the circuit is in the stable state represented by the operating point *c*, the voltage across the diode 90 is relatively high, corresponding to binary "1;" and diode conduction is low. In the absence of an information input pulse, the diode 90 assumes the low voltage stable state when an energizing pulse 95 is applied. The diode 90 may be switched to its high voltage state by increasing the current through the diode 90 above a critical value corresponding to the current $I_c$ indicated on the graph of FIGURE 6.

A plurality of weighted resistors $R_1$, $R/_2$ . . . $R/_{2n}$ of the type illustrated in FIGURE 3 and described previously are connected between different input terminals and the anode of diode 90. Signals representing the binary digits $x_0 \ldots x_n$ and $\bar{y}_0 \ldots \bar{y}_n$ are applied at the appropriate input terminals. The weighted resistors are selected in value so that an input pulse at any input terminal supplies an amount of current or voltage to the circuit in correspondence with its digit significance. For example, an input pulse corresponding to the digit $x_0$ is applied to the anode of the diode 90 through a resistor R. An input pulse corresponding to the digit $x_1$ is applied to the anode through a resistor $R/_2$ and supplies twice as much current to the tunnel diode 90 as the signal corresponding to the $x_0$ digit.

The values of the resistor 92 and the energizing pulse 95 are selected so that the tunnel diode 90 switches to the high voltage state and provides an output pulse having a voltage $V_b$ only if the sum of the inputs exceeds a certain value. The value of resistor 92 and the magnitude of the energizing pulse 95 thus determine the threshold of the tunnel diode circuit, and the values of these elements are chosen in accordance with Equation 12. If the input pulses have cancellation power, as where a binary "1" is represented by a positive pulse, and a binary "0" is represented by a negative pulse, then the resistor 92 may be selected to provide the load line 106 which intersects the positive resistance region of low voltage of the curve 100 close to the peak of the curve. The tunnel diode 90, in this case, switches to the high voltage state when the summation of the input signals has a small positive value. No switching occurs when the binary quantity X is equal to the quantity Y.

FIGURE 7 is a schematic diagram of a circuit suitable for use as the complementing device 18, 26 of FIGURE 1. Operation of this circuit is similar to that of FIGURE 5. The FIGURE 7 circuit comprises the series combination of a resistor 110, a tunnel diode 90, a resistor 112 and a pulse source 94, connected in that order. The values of the resistors 110, 112 may be selected to provide the load line 106 of FIGURE 4.

A resistor 114 is connected between an input terminal 116 and the anode of the tunnel diode 90. In the absence of an input pulse 116, the tunnel diode 90 assumes the low voltage state corresponding to point *d* of FIGURE 6 when the circuit is energized by a pulse from the pulse source 94. The diode 90 conducts heavily at this time, and the voltage at the output terminal 120 is then relatively high because of the voltage drop across the resistor 110. If, however, a positive input pulse 116, corresponding to a binary "1," is applied at the input terminal 116, the diode 90 switches to the high voltage state of relatively low conduction, and the voltage at the output terminal 120 is then low due to the reduced voltage drop across resistor 110. A negative pulse (not shown), corresponding to a binary "0," has the same effect on the diode 90 as the absence of an input pulse, and does not switch the tunnel diode from the low voltage state to the high voltage state. The FIGURE 7 circuit, therefore, may be used in a baseband system wherein binary "1" is a positive pulse or level, and binary "0" is either the absence of a pulse or a negative pulse or level.

Three phase pulse energizing techniques may be used in a baseband system employing tunnel diodes. The energizing pulses of different "phase" then overlap each other in the same manner as the RF bursts illustrated in FIGURE 4. Of course, the pulse sources 94 may be replaced with constant voltage sources if means are provided for periodically resetting the tunnel diodes to the low voltage state.

In some applications it may be necessary to limit the number of effective inputs in a threshold organ if reliable comparison results are to be obtained. Such a restriction may be due to limitations of the organ itself. In other cases, this restriction may become necessary when the phase and/or amplitude of the information signals are not held to close tolerances. FIGURE 8 is a block diagram of a comparator according to the invention wherein the number of effective inputs to a threshold organ does not exceed seven. By "effective inputs" is meant the absolute sum of the weighted inputs.

Let it be desired to compare two four-digit, binary quantities X and Y, where $X=x_3x_2x_1x_0$ and $Y=y_3y_2y_1y_0$. In the FIGURE 8 embodiment of the invention, this objective is achieved by (1) comparing $x_1x_0$ with $y_1y_0$, (2) comparing $x_4x_3$ with $y_4y_3$, and (3) comparing the results of (1) and (2) with each other after properly weighting the results of (1) and (2).

Signals representing the binary digits $x_1$, $x_0$, $\bar{y}_1$ and $\bar{y}_0$ are applied as inputs to a first threshold organ 130, designated "T.O. #1." These signals are weighted according to the ratio of their binary significance by any of the means described previously, the particular means depending upon the type of threshold organ employed. The signal input to the organ representing the digit of lesser significance is given a weight of unity in this and in all other threshold organs to be described. In like manner, signals representing the binary digits $\bar{x}_1$, $\bar{x}_0$, $y_1$ and $y_0$ are applied as inputs to a second threshold organ 132 and properly weighted according to the ratio of their binary significance. The outputs of the first and second threshold organs 130 and 132 are designated $x_0'$ and $y_0'$, respectively, for convenience.

Signals representing the binary digits $x_3$, $x_2$, $\bar{y}_3$ and $\bar{y}_2$ are applied to a third threshold organ 134 and properly weighted as aforesaid, the digit of lesser significance being given a weight of unity. Likewise, the signals representing the binary digits $\bar{x}_3$, $\bar{x}_2$, $y_3$ and $y_2$ are applied as inputs to a fourth threshold organ 136. The outputs of the third and fourth threshold organs 134 and 136 are designated $x_1'$ and $y_1'$, respectively.

Two additional threshold organs 138, 140 are provided for making a comparison between the derived quantities $x_1'x_0'$ and $y_1'y_0'$. The outputs $x_0'$ and $x_1'$ of the first and third threshold organs 130 and 134 are applied directly to the fifth threshold organ 138 and weighted as indicated by the numbers adjacent to the arrows on the input leads. These outputs are also complemented by devices 144, 146, applied to the sixth threshold gate 140 as signals representing $\overline{x_0'}$ and $\overline{x_1'}$, and weighted as indicated.

The outputs $y_0'$ and $y_1'$ of the second and fourth threshold gates 132 and 136, respectively, are applied directly as inputs to the sixth threshold organ 140. These outputs also are complemented by devices 150, 152 and applied to the fifth threshold gate 138 as signals representing $\overline{y_0'}$ and $\overline{y_1'}$. The fifth threshold organ 138 thereby receives signals representing $x_1'$, $x_0'$, $\overline{y_1'}$ and $\overline{y_0'}$; the sixth threshold organ 140 receives signals representing $\overline{x_1'}$, $\overline{x_0'}$, $y_1'$ and $y_0'$.

The output of the fifth threshold organ 138 is applied over a line 16 to an output terminal 14 and also is applied to the input of a complementing device 160. The output of the sixth threshold organ 140 is applied over a line 24 to a second output terminal 22, and also is applied to the input of a complementing device 162. The outputs of the complementing devices 160, 162 are applied to a seventh threshold organ 170.

Figure 4:
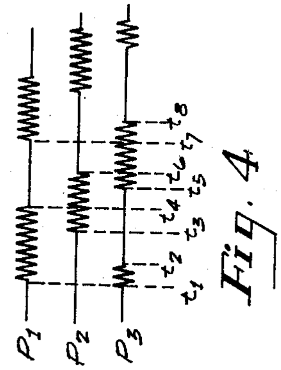
FIGURE 4 is a timing diagram of the three phase pump energizing source of FIGURE 3.

Threshold (T) signals or voltages are applied to each of the first through sixth threshold organs 130 . . . 140. A threshold ($T_2$) voltage or signal is applied to the seventh organ 170. The threshold may take any of the forms previously discussed, depending upon the type of device used as a threshold organ. In particular, if the threshold organs are PLO's, the thresholds (T) and ($T_2$) may be small amplitude signals at the PLO oscillating frequency and having a phase representing a binary "0." The three phase pumping means are not illustrated in the generalized case of FIGURE 8. It will be apparent, however, that if PLO's are used as the threshold organs, the first, second, third and fourth organs are pumped during one clock period, the fifth and sixth organs are pumped during a second clock period, and the seventh organ is pumped during a third clock period. The information input sources then are also pumped during the third clock period. The clock periods may be as illustrated in FIGURE 4.

Operation of the FIGURE 8 arrangement may be understood best by considering a few examples. Let $X=1111$ and $Y=1011$, that is X is greater than Y. In accordance with Equataion 3, $\overline{X}=0000$ and $\overline{Y}=0100$. The quantity $x_1x_0$ is equal to $y_1y_0$ and, therefore, each of the outputs $x_0'$ and $y_0'$ of the first and second organs is a binary "0." Since $x_3x_2$ is greater than $y_3y_2$, the output $x_1'$ of the third organ 134 is a binary "1" and the output $y_0'$ of the fourth organ 136 is a binary "0." The fifth threshold organ 138 receives the binary "1" inputs $x_1'$ and $\overline{y_1'}$. The output of the fifth threshold organ 138 is, therefore, a binary "1" and the output of the sixth threshold organ 140 is a binary "0."

The binary "1" output of the fifth threshold organ 138 appears at the first output terminal 14 as an indication that X is greater than Y. This output is inverted and applied to the seventh threshold organ 170 as a binary "0." Because of the threshold (T*a*) applied to this organ 170, a signal or level representing binary "0" appears at the output terminal 32 in the presence of a binary "0" input. The binary "0" output of the sixth threshold organ 140 appears at the output terminal 22.

If $X=Y$, then each of the first through the fourth organs 130 . . . 136 provides an output representing a binary "0" because of the threshold (T). The fifth and sixth threshold organs 138, 140 also provide binary "0" outputs for the same reason, and a binary "0" appears at each of the first and second output terminals 14 and 22. The binary "0" outputs of the fifth and sixth threshold organs 138 and 140 are complemented by devices 160 and 162, respectively, to provide first and second binary "1" input signals to the seventh threshold organ 170. The sum of these inputs exceeds the threshold (T2), and the seventh threshold organ 170 then has a binary "1" output. This "1" output appearing at the output terminal 22 signals that $X=Y$.

Consider now the case where Y is greater than X. Let $Y=1111$ and $X=1110$. The $\overline{Y}=0000$ and $\overline{X}=0001$. The output $x_0'$ of the first threshold organ 130 is a binary "0" because $x_1x_0$ is less than $y_1y_0$. The output $y_0'$ of the second organ 132 is a binary "1" for the same reason. The outputs $x_1'$ and $y_1'$ of the third and fourth organs 134, 136, respectively, are both binary "0" because $x_3x_2=y_3y_2$. The fifth threshold organ 138 receives a binary "0" signal representing $x_1'$ and a binary "1" signal representing $\overline{y_1'}$, each signal having a relative weight of two. This organ 138 also receives two binary "0" signals representing $x_0'$ and $y_0'$, each signal having a relative weight of one. Consequently, the output of the fifth threshold gate 138 is a binary "0," and this output appears at the first output terminal 14.

The sixth threshold organ 140 receives binary "1" signals representing $\overline{x_0'}$ and $y_0'$, a binary "1" signal representing $\overline{x_1'}$ and a binary "0" signal representing $y_1'$. This organ 140, therefore, provides a binary "1" output signal. Such an output is to be expected since $y_1'y_0'$ (01) is greater than $x_1'x_0'$ (00). This binary "1" output signal appearing at the second output terminal 22 signals that Y is greater than X. The output of the sixth threshold organ 140 is complemented by the device 162 and applied to the seventh threshold organ 170 as a binary "0" signal. Because of the threshold (T*a*) of this organ, and the binary "0" input, a binary "0" output is provided by this organ 170 and appears at the output terminal 32.

It will be apparent to those skilled in the art that any of the threshold devices illustrated in FIGURES 2, 4, and 5 are suitable for use as the threshold organs in the FIGURE 8 arrangement. It is to be understood, however, that the invention is not limited to these devices only. It will also be apparent that binary quantities of more than four digits may be compared according to the teachings of FIGURE 8 and the accompanying description by a suitable pyramiding of threshold organs.

What is claimed is:

1. A comparator for comparing first and second multidigit binary quantities comprising, in combination: first and second threshold organs; means for applying to said first and second organs weighted signals representing the binary digits of said first and second quantities, respectively; means for applying to said first and second organs weighted signals representing the bit by bit binary complements of the digits of said second and first quantities, respectively; and signal responsive means connected to the outputs of said first and second organs.

2. A comparator for comparing a first binary quantity and a second binary quantity comprising, in combination: a first threshold organ and a second threshold organ; means for applying to said first organ signals representing the binary digits of said first quantity and the bit by bit binary complements of the binary digits of said second quantity; means for applying to said second organ signals representing the binary digits of said second quantity and the bit by bit binary complements of said first quantity; means for weighting said signals according to their digit significance; and output means connected to receive the outputs of the first and second organs.

3. A comparator for comparing first and second multidigit binary quantities comprising, in combination: first and second threshold organs; means for applying to said first and second organs signals weighted according to digit significance in said quantities and representing the binary digits of said first and second quantities, respectively; means for applying to said first and second organs signals weighted according to digit significance in said quantities and representing the bit by bit binary complements of the binary digits of said second and first quantities, respectively; first and second output terminals connected to the outputs of said first and second threshold organs, respectively; and signal responsive means connected to receive the outputs of said first and second organs.

4. A comparator for comparing a first multidigit binary quantity and a second multidigit binary quantity, comprising: a first organ and a second organ, means for applying to said first organ weighted signals representing the binary digits of said first quantity and weighted signals representing the binary complements of the digits of said second quantity, means for applying to said second organ weighted signals representing the binary digits of said second quantity and weighted signals representing the binary complements of the digits of said first quantity, each of said signals being weighted in accordance with the significance in the quantity of the corresponding digit, said first organ having a threshold such that said first organ provides a first output only when said first quantity has the larger binary value and provides a second output at all other times, said second organ having a threshold such that said second organ provides said first output only when said second quantity has the larger value and provides said second output at all other times, and signal responsive means connected to receive the outputs of the first and second organs.

5. The comparator as claimed in claim 4 wherein each of said first organ and said second organ is a tunnel diode bistable circuit.

6. The comparator as claimed in claim 4 wherein said signal responsive means provides said first output when said first organ and said second organ are both providing said second output.

7. In an information handling system wherein the binary digits "one" and "zero" are represented by alternating current signals of one phase and a counter phase, respectively, at the same frequency, a comparator for comparing first and second multidigit binary quantities comprising, in combination: first and second phase locked oscillators each having two stable phases of oscillation at said frequency, said two phases corresponding to binary "one" and "zero"; means for applying to said first and second oscillators signals weighted according to digit significance and representing, respectively, the digits of said first and second quantities; means for applying to said first and second oscillators signals weighted according to digit significance and representing the bit by bit binary complements of the digits of said second and first quantities, respectively; and signal responsive means connected to receive the outputs of said first and second oscillators.

8. The comparator as claimed in claim 7, wherein said signal responsive means is a third phase locked oscillator.

9. In an information handling system wherein the binary digits "one" and "zero" are represented by alternating current signals of one phase and a counter phase, respectively, at the same frequency, a comparator for comparing first and second multidigit binary quantities comprising, in combination: first and second phase locked oscillators each having two stable phases of oscillation at said frequency, said two phases corresponding to binary "one" and "zero"; means for applying to said first and second oscillators signals weighted according to digit significance and representing the digits of said first and second quantities, respectively; means for applying to said first and second oscillators signals weighted according to digit significance and representing the bit by bit binary complements of the digits of said second and first quantities, respectively; and means for applying a reference threshold signal of said frequency to said first and second oscillators.

10. The comparator as claimed in claim 9 wherein said reference threshold signal has a phase corresponding to binary "zero."

11. The comparator as claimed in claim 10, wherein said output means includes means for inverting the outputs of said first and second oscillators, and a third phase locked oscillator connected to receive said inverted outputs and said reference signal.

12. A comparator for comparing a first multidigit binary quantity and a second multidigit binary quantity comprising: a first threshold organ and a second threshold organ; means for applying to said first organ signals representing the digits of said first quantity and the binary complements of the digits of said second quantity, said signals being weighted according to corresponding digit significance; means for applying to said second organ signals representing the digits of said second quantity and the binary complements of the digits of said first quantity, said signals being weighted according to digit significance; and a third threshold organ connected to receive the outputs of said first organ and said second organ.

13. The comparator as claimed in claim 12 including a first output means connected to the output of said first threshold organ, a second output means connected to the output of said second threshold organ, and a third output means connected to the output of said third threshold organ.

14. Apparatus for comparing a first binary quantity $X = x_n \ldots x_1x_0$ and a second binary quantity $Y = y_n \ldots y_1y_0$ comprising: first means for weighting according to digit significance signals representing the binary digits $x_n \ldots x_1x_0$ of X and signals representing the binary complements $y_n \ldots y_1y_0$ of the digits of Y; a first threshold organ connected at its input to said first weighting means for providing a first output when the sum of the weighted signals provided by said first weighting means is greater than $$\sum_{k=0}^{n} 2^k (y_k + \bar{y}_k)$$

and a second output at all other times; second means for weighting according to digit significance signals representing the binary complements $\bar{x}_n \ldots \bar{x}_1\bar{x}_0$ of the digits of X and signals representing the digits $y_n \ldots y_1y_0$ of Y; a second threshold organ connected at its input to said second weighting means for providing said first output when the sum of the weighted signals provided by said second weighting means is greater than $$\sum_{k=0}^{n} 2^k (x_k + \bar{x}_k)$$

and said second output at all other times; and signal responsive means connected to receive the outputs of the first and second organs.

15. The apparatus as claimed in claim 14, wherein said signal responsive means provides said first output when said first organ and said second organ both provide said second output.

References Cited in the file of this patent

UNITED STATES PATENTS

| | | |
|---|---|---|
| 2,885,655 | Smoliar | May 5, 1959 |
| 2,954,928 | Davey | Oct. 4, 1960 |

UNITED STATES PATENT OFFICE
CERTIFICATE OF CORRECTION

Patent No. 3,124,677 March 10, 1964

Henry S. Miiller

It is hereby certified that error appears in the above numbered patent requiring correction and that the said Letters Patent should read as corrected below.

Column 2, line 40, for "is noted" read -- is to be noted --; line 43, for "coefficient" read -- coefficients --; column 3, line 9, for "the bit one's" read -- the bit by bit one's --; column 4, line 10, for "$X_D$" read -- $Y_D$ --; line 51, after "binary" insert -- digits --; line 60, for "thereinafter" read -- hereinafter --; column 14, line 40, for "$y_n \ldots y_1 y_0$" read -- $\bar{y}_n \ldots \bar{y}_1 \bar{y}_0$ --.

Signed and sealed this 28th day of July 1964.

(SEAL)

Attest:

ESTON G. JOHNSON
Attesting Officer

EDWARD J. BRENNER
Commissioner of Patents